United States Patent
Kumar et al.

(10) Patent No.: US 7,594,443 B2
(45) Date of Patent: Sep. 29, 2009

(54) MECHANICALLY TUNABLE OPTICAL-ENCODED FORCE SENSOR

(75) Inventors: Karthik Kumar, Austin, TX (US); Xiaojing Zhang, Austin, TX (US)

(73) Assignee: The Board of Regents, University of Texas System, Austin, TX (US)

( * ) Notice: Subject to any disclaimer, the term of this patent is extended or adjusted under 35 U.S.C. 154(b) by 0 days.

(21) Appl. No.: 11/868,106

(22) Filed: Oct. 5, 2007

(65) Prior Publication Data

US 2008/0083289 A1    Apr. 10, 2008

Related U.S. Application Data

(60) Provisional application No. 60/828,684, filed on Oct. 9, 2006.

(51) Int. Cl.
    *G01L 1/24* (2006.01)
(52) U.S. Cl. .......................................... 73/800; 73/105
(58) Field of Classification Search .................. 73/800, 73/105
    See application file for complete search history.

(56) References Cited

U.S. PATENT DOCUMENTS

| | | | |
|---|---|---|---|
| 5,908,981 A | | 6/1999 | Atalar et al. |
| 5,969,821 A | * | 10/1999 | Muramatsu et al. ......... 356/613 |
| 6,246,055 B1 | | 6/2001 | Koops et al. |
| 6,298,715 B1 | * | 10/2001 | Thomson et al. .............. 73/105 |
| 6,642,517 B1 | * | 11/2003 | Ghislain et al. ............. 250/306 |
| 7,054,054 B1 | * | 5/2006 | Srinivasan et al. .......... 359/295 |
| 7,347,085 B2 | * | 3/2008 | Taber ........................... 73/105 |
| 2003/0108935 A1 | * | 6/2003 | Wang et al. ..................... 435/6 |
| 2005/0285541 A1 | * | 12/2005 | LeChevalier ............. 315/169.3 |
| 2007/0103697 A1 | * | 5/2007 | Degertekin ................. 356/501 |

* cited by examiner

*Primary Examiner*—Max Noori
(74) *Attorney, Agent, or Firm*—Antony P. Ng; Dillon & Yudell LLP

(57) ABSTRACT

An optical-encoded force sensor is disclosed. The optical-encoded force sensor includes a cantilever probe having a probe tip, a set of reflective phase gratings and multiple nano-photonic displacement sensors. The reflective phase gratings are mechanically coupled to the cantilever probe, and the nano-photonic displacement sensors are mechanically coupled to the reflective phase gratings. In response to a load being applied to the probe tip, the reflective phase gratings can be compressed such that a diffraction order of the reflective phase gratings changes according to the force of the applied load.

5 Claims, 3 Drawing Sheets

MECHANICALLY TUNABLE OPTICAL-ENCODED FORCE SENSOR

RELATED APPLICATION

The present application claims priority under 35 U.S.C. § 119(e)(1) to provisional application No. 60/828,684 filed on Oct. 9, 2006, the contents of which are incorporated herein by reference.

BACKGROUND OF THE INVENTION

1. Technical Field

The present invention relates to sensors in general, and in particular to nano-photonic force sensors. Still more particularly, the present invention relates to a mechanically-tunable nano-photonic force sensor.

2. Description of Related Art

Cell mechanics plays a critical role in many fundamental biological processes such as embryonic morphogenesis, angiogenesis, inflammation and wound healing. A variety of studies in developmental biology and genetics, which includes RNA interference (RNAi), can be facilitated by localized microsurgery capable of delivering genetic materials into biological model systems such as Drosophila melanogaster.

However, any forces applied to the surface of a cell may lead to variations in viscoelastic moduli from one region of the cytoplasm to another. Also, in order for the developmental biology and genetics studies to be carried out in vivo, damages caused by penetration of cell membranes need to be minimized. Thus, new tools are needed to allow in vivo cellular analysis of cell division and growth to be performed.

The present disclosure provides a mechanically-tunable nano-photonic force sensor capable of measuring mechanical interactions, cytoskeletal geometry and intracellular force of a cellular structure.

SUMMARY OF THE INVENTION

In accordance with a preferred embodiment of the present invention, a mechanically-tunable optical-encoded force sensor includes a cantilever probe having a probe tip, a set of reflective phase gratings and multiple nano-photonic displacement sensors. The reflective phase gratings are mechanically coupled to the cantilever probe, and the nano-photonic displacement sensors are mechanically coupled to the reflective phase gratings. In response to a load being applied to the probe tip, the reflective phase gratings can be compressed such that a diffraction order of the reflective phase gratings changes according to the force of the load.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
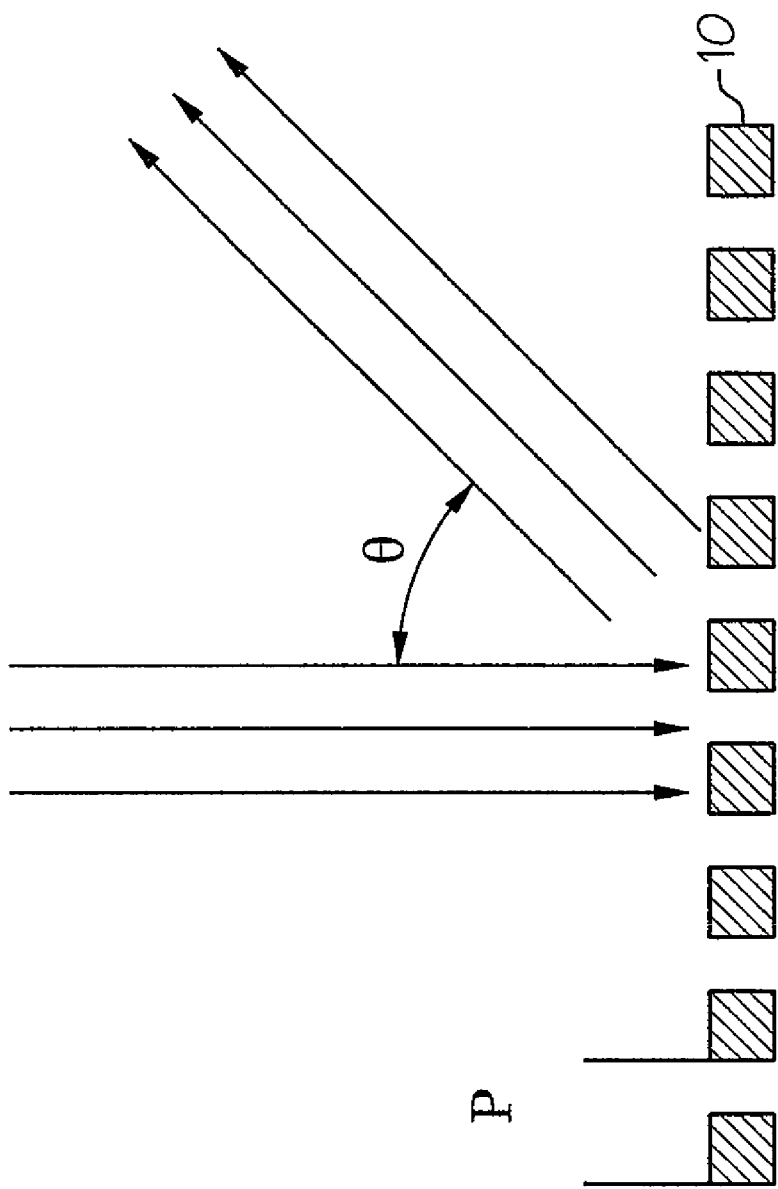
FIG. 1 is a diagram of the interaction of light diffraction and reflective phase gratings.

Referring now to the drawings and in particular to FIG. 1, there is depicted a diagram of the interaction of light diffraction and reflective phase gratings. In general, the interaction of light with reflective phase gratings 10 is governed by the diffraction equation, as follows:

$$m\lambda = p(\sin \alpha + \sin \theta) \quad (1)$$

where m is the diffraction order, $\lambda$ is the wavelength of light, p is the pitch of gratings 10, $\alpha$ is the angle of illumination, and $\theta$ is the diffraction angle.

If pitch p of grating 10 is changed by $\Delta p$ via compressing grating 10, the change in diffraction angle $\theta$ for normal illumination, $\Delta\theta$, can be calculated by $$\frac{\Delta\theta}{\Delta p} = -\frac{m\lambda}{p^2 \sqrt{1 - \left(\frac{m\lambda}{p}\right)^2}} \quad (2)$$

where m is the diffraction order, $\lambda$ is the wavelength of light, p is the pitch of gratings 10, $\alpha$ is the angle of illumination, and $\theta$ is the diffraction angle.

The working principles of an optical-encoded force sensor is governed by equation (2). Equation (2) shows that the sensitivity of an optical-encoded force sensor can be increased by reducing pitch p of grating 10 in order to match the wavelength of light at the nanometer regime.

Figure 2:
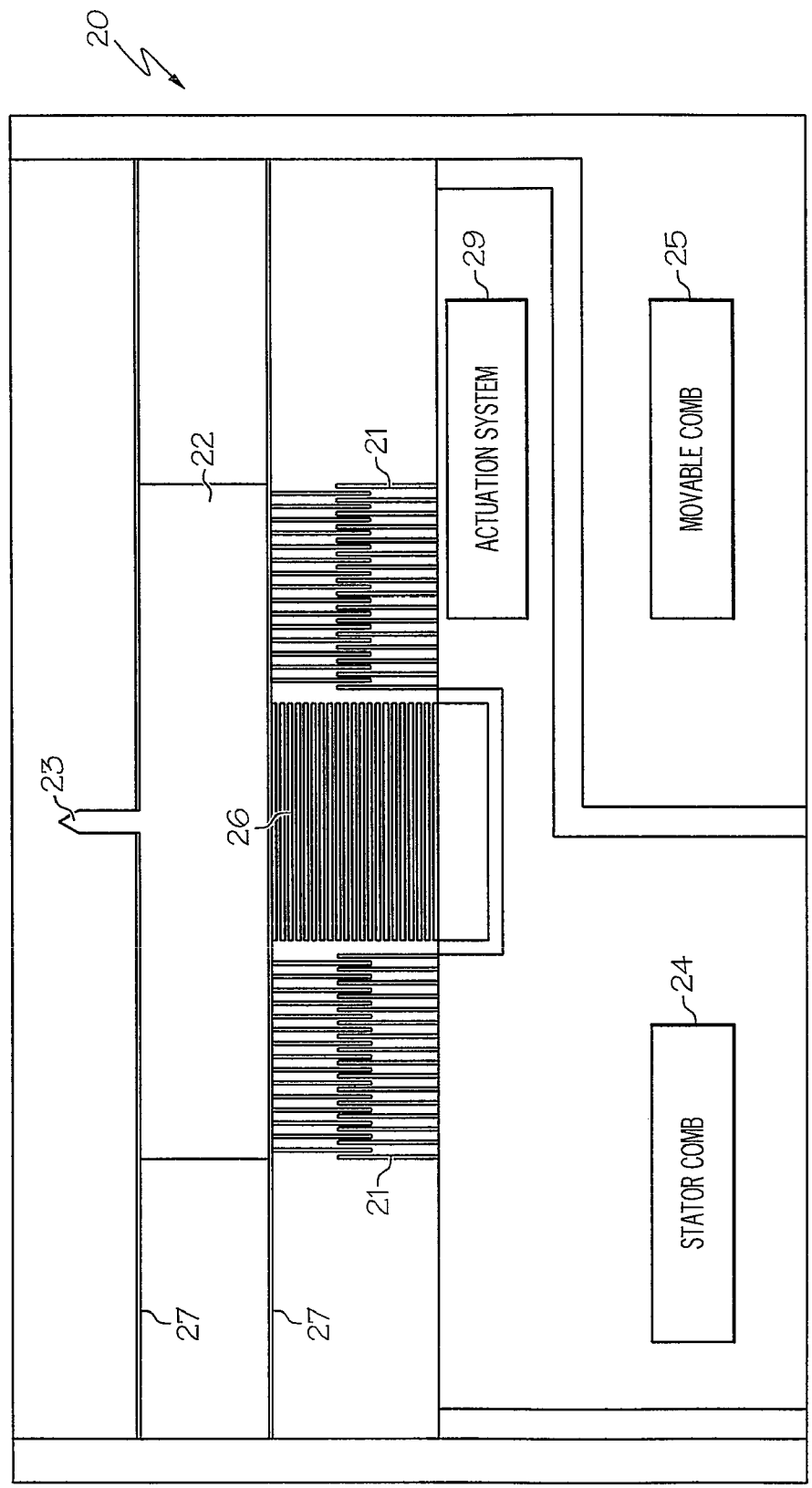
FIG. 2 is a diagram of an optical-encoded force sensor, in accordance with a preferred embodiment of the present invention.

With reference now to FIG. 2, there is depicted a diagram of an optical-encoded force sensor that can be used for cell manipulation and studies of cell mechanics, in accordance with a preferred embodiment of the present invention. As shown, an optical-encoded force sensor 20 includes a cantilever probe 22 having a probe tip 23. Cantilever probe 22 is mechanically coupled to reflective phase gratings 26 having a set of nano-scale elements. Optical-encoded force sensor 20 also includes multiple nano-photonic displacement sensors 21 that are mechanically coupled to reflective phase gratings 26. Reflective phase gratings 26, which are suspended by supporting beams 27, can be compressed in response to a load being applied to probe tip 23. The compression changes the pitch of reflective phase gratings 26, which leads to a change in position of the diffraction orders. The probe displacement is reconstructed by tracking the change in position of the diffraction orders. Supporting beams 27 are designed to have a known stiffness index, which can be used to determine the force of the load being applied to probe tip 23 that caused the probe displacement.

Optical-encoded force sensor 20 is also equipped with electrostatic comb drive actuators 29 that are capable of moving cantilever probe 22 and compress reflective phase grating 26 by application of a voltage between a bank of stator combs 24 and a bank of movable comb 25. Electrostatic comb drive actuators 29 can be used to mechanically bias reflective phase grating 26 to tune its force measurement range and sensitivity to the requirements of a specific application, and for microsurgical operations to penetrate a cell and deliver genetic material using a probe equipped with a microfluidic channel, for RNA interference (RNAi) studies.

Figure 3:
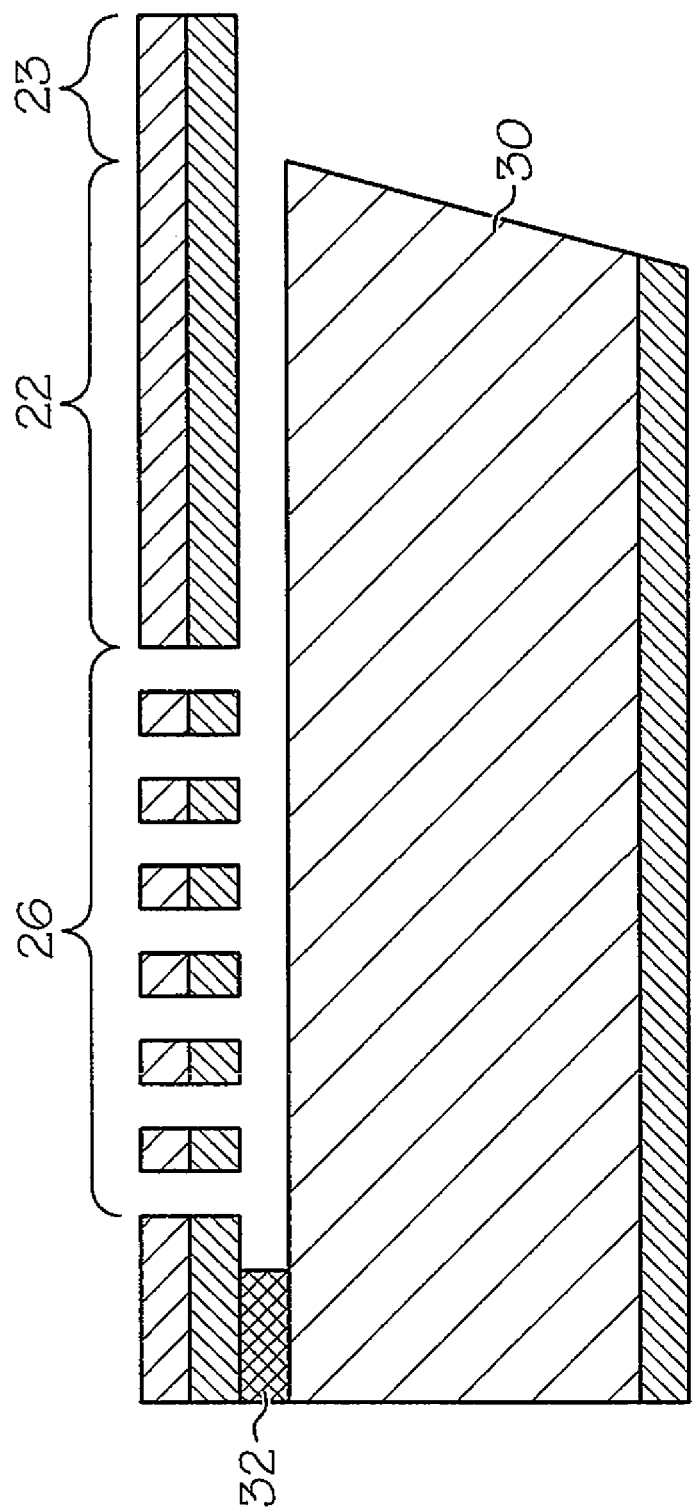
FIG. 3 is a cross-sectional diagram of a cantilever probe within the optical-encoded force sensor from FIG. 2, in accordance with a preferred embodiment of the present invention.

Referring now to FIG. 3, there is illustrated a cross-sectional diagram of cantilever probe 22, in accordance with a preferred embodiment of the present invention. As shown, cantilever probe 22 along with probe tip 23 are mechanically coupled to reflective phase gratings 26. Probe tip 23, cantilever probe 22 and reflective phase gratings 26 formed a rigid structure connected to a silicon substrate 30 via a support structure 32. Probe tip 23, cantilever probe 22 and reflective phase gratings 26 can be fabricated using nanofabrication techniques such as electron beam lithography (EBL), reactive ion etching (RIE), and anisotropic wet etching of silicon using potassium hydroxide.

As has been described, the present invention provides a mechanically-tunable optical-encoded force sensor.

While the invention has been particularly shown and described with reference to a preferred embodiment, it will be understood by those skilled in the art that various changes in form and detail may be made therein without departing from the spirit and scope of the invention.

What is claimed is:

1. A mechanically-tunable optical-encoded force sensor comprising:
    a cantilever probe having a probe tip;
    reflective phase gratings mechanically coupled to said cantilever probe, wherein said reflective phase gratings are capable of being compressed in response to a load being applied to said probe tip such that a diffraction order of said reflective phase gratings changes according to a force of said applied load; and
    a plurality of nano-photonic displacement sensors mechanically coupled to said reflective phase gratings.

2. The force sensor of claim 1, wherein said reflective phase gratings are formed by a set of nano-scale elements.

3. The force sensor of claim 1, wherein said reflective phase gratings are suspended by a plurality of supporting beams.

4. The force sensor of claim 3, wherein said plurality of supporting beams are designed to have a known stiffness index that can be used to determine said force of said applied load to said probe tip.

5. A mechanically-tunable optical-encoded force sensor comprising:
    a cantilever probe having a probe tip;
    reflective phase gratings mechanically coupled to said cantilever probe, wherein said reflective phase gratings are capable of being compressed in response to a load being applied to said probe tip such that a diffraction order of said reflective phase gratings changes according to a force of said applied load, wherein the pitch of said reflective phase gratings changes when said reflective phase gratings are being compressed in response to a load being applied to said probe tip, wherein the change in diffraction angle θ for normal illumination, Δθ, is calculated by $$\frac{\Delta\theta}{\Delta p} = -\frac{m\lambda}{p^2\sqrt{1-\left(\frac{m\lambda}{p}\right)^2}}$$

where m is the diffraction order, λ is the wavelength of light, p is said pitch of said reflective phase gratings, Δp is the pitch change of said reflective phase gratings is changed, α is the angle of illumination, and θ is the diffraction angle; and
    a plurality of nano-photonic displacement sensors mechanically coupled to said reflective phase gratings.

* * * * *